(No Model.)
M. E. BENEDICT.
GEARING.
No. 401,993.  Patented Apr. 23, 1889.
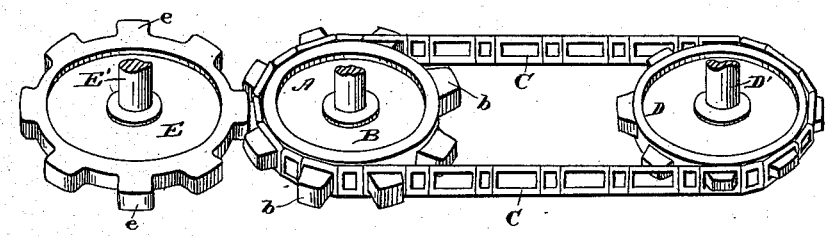
Witnesses.
Chas. R. Burr.
Thomas Durant.
Inventor.
Milton E. Benedict
by Church & Church
his Attorneys.

UNITED STATES PATENT OFFICE.

MILTON E. BENEDICT, OF PERRY, NEW YORK.

GEARING.

SPECIFICATION forming part of Letters Patent No. 401,993, dated April 23, 1889.

Application filed July 9, 1888. Serial No. 279,443. (No model.)

*To all whom it may concern:*

Be it known that I, MILTON E. BENEDICT, of Perry, in the county of Wyoming and State of New York, have invented certain new and useful Improvements in Gearing; and I do hereby declare the following to be a full, clear, and exact description of the same, reference being had to the accompanying drawing, forming part of this specification, and to the figures and letters of reference marked thereon.

My present invention relates to improvements in gearing, whereby I am enabled to simplify the construction of the parts, dispensing with one gear-wheel when desired to transmit motion to or from a shaft being driven from or driving a sprocket-chain; and to this end the invention consists in providing a gear-wheel engaging directly with the teeth of said sprocket-wheel, so that the chain passing to or from the latter will not come in engagement nor interfere with its proper operation; and the invention further consists in certain improved constructions and combinations of parts, all as will be hereinafter fully described, and pointed out particularly in the claims at the end of this specification.

The drawing is a view of my invention in which the power is transmitted to or derived from the sprocket-wheel outside of the chain.

Similar letters of reference indicate similar parts.

Heretofore when desired to transmit motion from one shaft driven by a sprocket-chain to another one extending parallel with it, it has been customary, if the two are to move in the same direction, to connect them by a separate sprocket-chain, or if in opposite directions by intermeshing gears; but such means of connection necessitates the employment of an extra chain or gear wheel, not only increasing the expense, but also the weight of the parts; and in grain harvesters and binders, to which my invention is particularly adapted to be applied, the diminution of weight consistent with proper operation is a thing to be desired, and consequently the advantages of my improved manner of gearing, whereby the extra chain or gear wheel is dispensed with, will be more appreciated when used upon the class of machinery mentioned.

Referring to the drawing, A represents a shaft upon which is mounted a wheel, B, having the sprocket-teeth $b$ preferably slightly longer and broader than the ordinary teeth employed, and C a sprocket-chain extending over said wheel in the usual manner and around a chain-wheel, D, mounted upon a shaft, D'. On the side of the wheel B opposite wheel D is located a gear-wheel, E, on a shaft, E', having gear-teeth adapted to mesh with the portion of the teeth $b$ projecting beyond the chain, as shown.

It will be noted that the teeth $b$ on the wheel B are, as stated, slightly longer and broader than the ordinary sprocket-teeth, the first provision being for the purpose of engaging with the teeth of gear E and the latter so that a sufficiently broad bearing will be given the teeth; but they are not of such length radially and circumferentially relative to the space in the links of the chain as to prevent the latter leaving them readily at the proper point.

The teeth $e$ on the gear E are preferably slightly longer circumferentially than ordinarily, to provide for properly engaging teeth $b$ (which are somewhat separated for the chain-links) without lost motion, being so arranged as to give an even steady motion when moved in either direction, though this arrangement is not absolutely essential, as, if the motion is never to be reversed, the mere engagement of the teeth ends on the two wheels will be sufficient. Further, the teeth $e$ do not project between teeth $b$ a sufficient distance to strike the chain; but the point of their engagement is outside it.

It will now be understood that the motion imparted to one of these three shafts will be transmitted to the others through the chain, sprocket-wheel, and co-operating gear engaging with the extended teeth on the latter.

While the gearing herein described can be employed for any desired purpose, it is particularly adapted for use in a grain-binder, D indicating the wheel connected to the main driving-axle, B the master-wheel controlling the binding apparatus, and C a wheel operating a co-operating portion of the bundle-forming devices, though I do not desire to be confined to this arrangement.

I claim as my invention—

1. The combination, with the sprocket-wheel and the chain passing around the same, the sprocket-teeth being extended beyond the chain between them, of the gear having teeth projecting between and engaging with each of the carrying-teeth on the sprocket, substantially as described.

2. The combination, with the gear-wheel, of the sprocket-wheel and chain, the carrying-teeth on the sprocket having a broad operating-surface and extending beyond the chain a sufficient distance for the engagement of the gear, substantially as described.

3. The combination, with the sprocket-wheel having the extended carrying-teeth and the chain, of the gear-wheel having its teeth circumferentially extended to engage those on the sprocket-wheel without any lost motion, substantially as described.

MILTON E. BENEDICT.

Witnesses:
C. A. FANNING,
C. H. FOAN.